United States Patent [19]

Castleberry

[11] 4,420,897
[45] Dec. 20, 1983

[54] ELECTROSCOPIC DISPLAY DEVICES
[75] Inventor: Donald E. Castleberry, Schenectady, N.Y.
[73] Assignee: General Electric Company, Schenectady, N.Y.
[21] Appl. No.: 359,402
[22] Filed: Mar. 18, 1982
[51] Int. Cl.³ .......................... A47F 11/06; G09F 9/00
[52] U.S. Cl. ...................................... 40/427; 350/486; 340/763
[58] Field of Search ................................ 350/486, 269; 340/815.27, 764, 763, 783, 815.24, 815.06, 815.07; 40/427, 446, 447, 448, 449, 450, 451, 452

[56] References Cited
U.S. PATENT DOCUMENTS
4,178,077  12/1979  Te Velde ............................ 350/285

Primary Examiner—Gene Mancene
Assistant Examiner—James Hakomaki
Attorney, Agent, or Firm—Geoffrey H. Krauss; James C. Davis, Jr.; Marvin Snyder

[57] ABSTRACT

An electroscopic display cell in which stationary and moveable plate electrodes are fabricated upon a single substrate to provide a display with operating characteristics independent of cell thickness. The stationary electrodes are overcoated with a dielectric layer and a conductive plate electrode structure is thereafter fabricated upon the dielectric layer. Each electrode plate has a rest position determined by support members affixed to the dielectric layer and independent of the spacing between the single substrate and another substrate, which serves only to contain a display fluid.

11 Claims, 2 Drawing Figures

ELECTROSCOPIC DISPLAY DEVICES

BACKGROUND OF THE INVENTION

The present application relates to electroscopic display devices and, more particularly, to a novel electroscopic display device having the electrode structure thereof fabricated upon a single substrate.

Electroscopic display devices are known to the art. Several such devices, and methods for the fabrication thereof, are disclosed and claimed in my co-pending U.S. application Ser. No. 303,275, filed Sept. 17, 1981, assigned to the assignee of the present invention and incorporated herein by reference in its entirety. The electroscopic displays described therein comprise moveable metal plates in a fluid-filled cell. This form of electroscopic display requires that each metal plate be capable of movement, from a resting position adjacent a first substrate to an active position adjacent a second substrate spaced from the first substrate, through a fluid layer, typically having a thickness on the order of 15 microns. Hitherto, electroscopic display devices have been built with the conductive plate fabricated upon the interior surface of one of the substrates (e.g. the rear substrate interior surface) with a stationary electrode fabricated upon the interior surface of the remaining substrate (e.g. the front substrate interior surface). For example, in FIG. 1, prior art display cell 1 utilizes a pair of spaced transparent substrates 2 and 3, upon the interior facing surfaces of which are respectively fabricated stationary electrode 4, overcoated with a thin dielectric layer (not shown), and an electrode-plate structure including conductive portions 5 fixed to the interior surface of substrate 3 and moveable plate conductor 6, connected by spring member 7 to fixed portions 5. A light-absorbing fluid layer 8 fills the volume between the substrates. A voltage source 9a is connected in series with switching means 9b, between the front electrode 4 and the fixed rear electrode-plate portions. With switch 9b open, a field does not form between electrodes 4 and 6 and the springs 7 cause plate 6 to rest against the interior surface of substrate 3 (as shown at the left side of FIG. 1). Light enters through substrate 2, is passed through substantially transparent electrode 4 and then is essentially absorbed in liquid 8; the area defined by plate 6 is relatively dark. Upon closure of switch 9b, a voltage is applied between electrode 4 and plate 6', and plate 6' is attracted upwardly to plate 4 (as shown at the right side of FIG. 1). Plate 6' having moved to a position adjacent electrode 4, light entering through substrate 2 is transmitted through electrode 4 and reflected by plate 6' after undergoing relatively little attenuation in liquid 8; the area defined by plate 6' is a viewable bright area through substrate 2. Upon opening switch 9b, the field is removed and the energy stored in springs 7' return plate 6' to a rest position adjacent rear substrate 3.

It will be seen that any variation in the spacing S between the front electrode and rear electrode-plate portions will cause a variation in the voltages required to turn "on" and turn "off" the cell element defined by a particular plate 6. This turn-on and turn-off voltage variation problem is particularly noticeable in large area displays, and especially in such displays utilizing a relatively low cost glass for the substrates. It is therefore highly desirable to provide an electroscopic display device having display cell operating characteristics which are independent of display cell thickness.

BRIEF SUMMARY OF THE INVENTION

In accordance with the invention, an electroscopic display cell, having operating characteristics substantially independent of cell thickness, utilizes: a fixed electrode fabricated upon an interior surface of a first substrate; a dielectric layer deposited over the fixed electrode; and a moveable plate electrode structure fabricated to be supported upon, and spaced from, the dielectric layer. The spacing distance between the fixed electrode and the moveable plate electrode, in its rest position, is thus fixedly established, independent of the presence or placement of a cell rear substrate. The cell rear substrate is utilized only to contain a quantity of light-absorbing fluid, which fluid also fills the volume between the dielectric layer and moveable plate of the single substrate operational structure of the cell.

In one presently preferred embodiment, the moveable plate electrode, spring member and fixed support portions are all fabricated by masking and subsequent etching of a plurality of conductive layers sequentially formed upon the dielectric layer surface.

Accordingly, it is an object of the present invention to provide a novel electroscopic display device having display cells in which fixed and moveable electroscopic electrodes are maintained at substantially constant spacing.

This and other objects of the present invention will become apparent upon consideration of the following detailed description, when read in conjunction with the drawings.

DETAILED DESCRIPTION OF THE INVENTION

Figure 1:
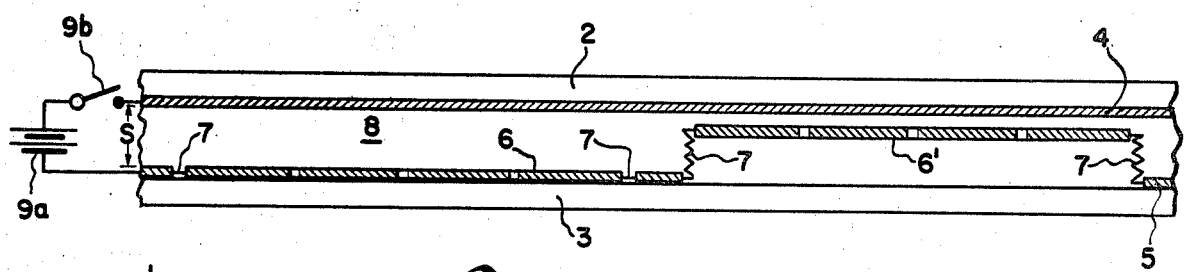
FIG. 1 is a sectional side view of a portion of a prior art electroscopic display device, as described hereinabove.
Figure 2:
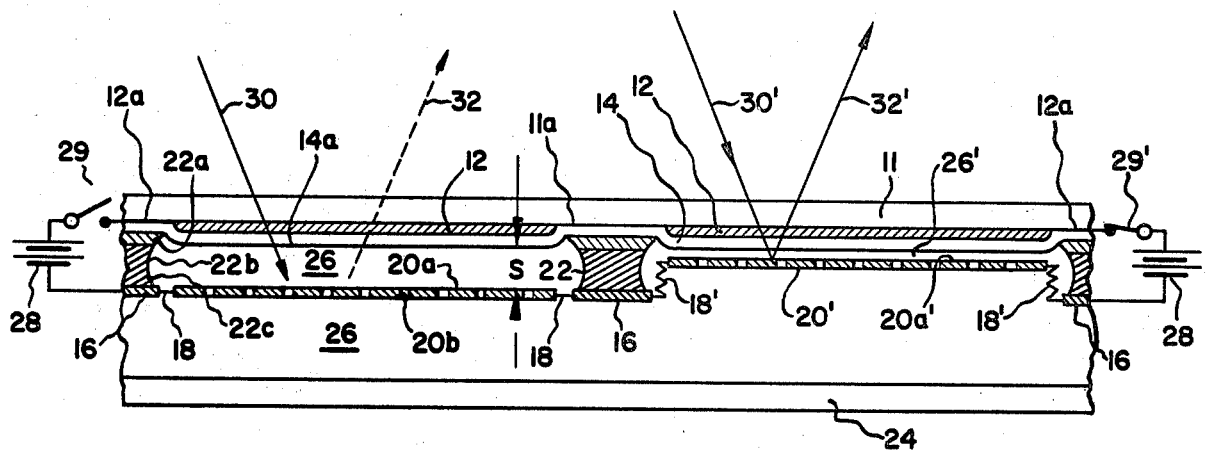
FIG. 2 is a sectional side view of a portion of a novel electroscopic display device in accordance with the principles of the present invention.

Referring to FIG. 2, the spacing problems described with respect to the prior art embodiment of FIG. 1 are alleviated by supporting all of the elements, determining the cell optical condition upon only one of the cell substrates. Display device 10 includes a front substrate 11, fabricated of a transparent material such as glass and the like. Each of a plurality of display cells is defined by a substantially transparent conductive electrode 12, fabricated upon the interior surface 11a of the front substrate. Each of fixed electrodes 12 has a predeterminate, e.g. square, shape and is isolated from each of the remaining fixed electrodes 12. In a matrix display, each transparent electrode 12 is a stripe with width of one display cell and of length equal to the display length, running into and out of the plane of the drawing. Suitable lead means 12a may be extended from each electrode 12 to an edge of the display, for facilitating electrical connection to each transparent electrode. Advantageously, the transparent electrodes and leads may be fabricated of a material such as indium-tin oxide, utilizing known techniques.

After fabrication of electrodes 12 and leads 12a, a layer 14 of a dielectric material is fabricated upon the entire electrode-bearing interior surface of substrate 11.

The fixed support 16, spring 18 and moveable plate electrode 20 portions of a second electrode structure are fabricated substantially in accordance with the methods described and claimed in the aforementioned co-pending application Ser. No. 303,275. Thus, a relatively thick layer of an etchable material, e.g. copper, which will form fixed portions support columns 22, is applied to the dielectric layer surface 14a furthest from substrate 11. The thickness of the etchable material layer is determined by the desired spacing S' between dielectric layer surface 14a and the facing surface 20a of the moveable plate 20, in its rest position (coplanar with fixed support portions 16). For example, as dielectric layer 14 will be relatively thin, a spacing S' distance of about 15 microns can be achieved with a copper layer-support column 22 thickness also on the order of 15 microns. Advantageously, a thin copper base layer 22a is first deposited onto the dielectric layer surface, and additional layers 22b and 22c of etchable conductive material are formed thereon. This material may be copper, formed by electroplating to the desired thickness. Thereafter, a top layer of another conductive material, preferably of a material different from the material forming the layer from which columns 22 will be fabricated, is fabricated furthest from substrate 11, and will form fixed portion 16, spring portions 18 and plate portions 20. Photoresist masking techniques and preferential etching or additive deposition are utilized to form the spring portions 18, connecting fixed portion 16 and plate portions 20, and the multiplicity of apertures 20b formed through each plate portion 20. Preferential etching is also utilized to etch away the material between plate surface 20a and dielectric layer surface 14a, leaving only columns 22 attached between each fixed portion 16 and a portion of dielectric layer 14 devoid of a fixed electrode 12 thereunder.

After fabrication of the cell electrode structure, which is supported only by the front substrate 11, the device is completed by: positioning a rear substrate 24 substantially in registration with front substrate 11; providing a suitable seal (not shown) between substrates 11 and 24; and filling the volume therebetween with a light-absorbing liquid 26. The liquid passes through plate apertures 20b and fills the volume between dielectric surface 14a and plate surface 20a, as well as the volume between plates 20 and the rear substrate 24. It should be understood that rear substrate 24 is spaced sufficiently far from plates 20 so as not to interfere with operation of each display cell of the device, and need not have a parallel orientation with the plane of front substrate surface 11a (thus reducing the device fabrication cost).

In operation, a potential source 28 is connected in series with switching means 29, between the front fixed electrode lead 12a and the integrally-connected support 16-spring 18-plate 20 portions of each cell; there may be a multiplicity of such cells in a particular display device. With switch means 29 open, an electric field does not exist between fixed electrode 12 and plate electrode 20, whereby spring portions 18 bias the plate in the normally-resting position, coplanar with support portions 16. An entering light ray 30 thus passes through substantially transparent front substrate 11, substantially transparent fixed electrode 12 and substantially transparent dielectric layer 14, into the light-absorbing fluid 26. The thickness S' of the liquid layer 26 is selected such that substantially all of the entering light is absorbed within the layer, whereby substantially no light is reflected back through the front substrate as reflected ray 32.

Thus, the cell defined by the plate 20 in its rest position has a substantially dark optical condition.

When the switching means is closed, as illustrated by closed switch 29', the resulting electrical field acts upon the plate and attracts the plate to a position, illustrated by plate 20', adjacent to the dielectric layer surface 14a. An entering light beam 30' passes substantially unimpeded through front substrate 11, electrode 12 and dielectric layer 14. Because the thickness of the light-absorbing liquid layer 26' between dielectric layer 14 and the now-adjacent plate surface 20a', is small, relatively little light absorption occurs prior to reflection of the light ray at plate surface 20a'. Similarly, relatively little absorption of the reflected light ray occurs during transmission back through liquid layer 26', prior to transmission of the reflected beam through dielectric layer 14, electrode 12 and front substrate 11. Thus, the reflected ray 32' is of substantial magnitude and the cell defined by the moved plate 20' is in a bright optical condition. The difference in optical conditions between the dark cell (plate at rest) and the bright cell (plate adjacent to dielectric layers) is readily apparent to a viewer. It will be seen that the operation of display device 10 does not depend upon the spacing between plates 20 and rear substrate 24, nor upon the thickness of the liquid layer therebetween.

While one presently preferred embodiment of my novel electroscopic display device has been described in detail herein, many modifications and variations will now become apparent to those skilled in the art. It is my intent, therefore, to be limited only by the scope of the appending claims, and not by the specific details and instrumentalities described by way of example herein.

What is claimed is:

1. An information display device, comprising:
 a substantially transparent substrate having a surface;
 at least one conductive electrode fabricated upon the substrate surface;
 a layer of a dielectric material fabricated over at least said at least one conductive electrode;
 at least one additional conductive electrode comprising at least one support portion, at least one plate portion positioned in registration with an associated one of said at least one conductive electrode and each having a periphery, and spring arm means connected between each plate portion periphery and associated ones of said at least one support portion for mechanically biasing each plate portion to a resting position;
 support means, attached only between each of said at least one support portion of said at least one additional electrode and one of said substrate surface and said dielectric layer, for maintaining the resting plate portion of said at least one additional conductive electrode substantially parallel to and at a predetermined distance from said dielectric layer;
 a quantity of a light-absorbing liquid material; and
 means only for containing said liquid material at least between said dielectric layer and said plate portion of said at least one additional conductive electrode;
 each plate portion being adapted for movement, against the force of said spring arm means, toward an associated one of said at least one conductive electrode, responsive to the coupling of a potential between that plate portion and the associated one of said at least one conductive electrode.

2. The display device of claim 1, wherein said support means comprises a column of a rigid material.

3. The display of claim 3, wherein the column material is copper.

4. The display device of claim 1, wherein said substrate is glass.

5. The display device of claim 1, wherein said conductive electrode is formed of indium-tin oxide.

6. The display device of claim 1, further comprising lead means for facilitating individual application of an electrical potential to each of said at least one conductive electrode.

7. The display device of claim 1, wherein the spacing between said dielectric layer and said plate portion of said at least one additional conductive electrode is about 15 microns.

8. The display device of claim 1, wherein each plate portion has a multiplicity of apertures formed therethrough.

9. The display device of claim 8, wherein each plate portion is of substantially square shape.

10. The display device of claim 9, wherein each of said at least one conductive electrode is of substantially square shape.

11. The display device of claim 9, wherein each of said at least one conductive electrode is a stripe positioned in registration with a plurality of aligned plate portions.

* * * * *